United States Patent
Suzuki (10) Patent No.: US 11,509,214 B2
(45) Date of Patent: Nov. 22, 2022

(54) APPARATUSES AND METHODS FOR CONTROLLING CHARGE PUMP CIRCUITS

(71) Applicant: Micron Technology, Inc., Boise, ID (US)

(72) Inventor: Takamasa Suzuki, Hachioji (JP)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 15/963,909

(22) Filed: Apr. 26, 2018

(65) Prior Publication Data

US 2019/0334432 A1     Oct. 31, 2019

(51) Int. Cl.
    *H02M 3/07*     (2006.01)
(52) U.S. Cl.
    CPC ..................... *H02M 3/07* (2013.01)
(58) Field of Classification Search
    CPC ... H02M 3/07; H02M 3/073; H02M 2003/075
    See application file for complete search history.

(56) References Cited

U.S. PATENT DOCUMENTS

| | | | | |
|---|---|---|---|---|
| 6,483,377 B2* | 11/2002 | White | ..................... | H02M 3/07 327/536 |
| 6,486,728 B2* | 11/2002 | Kleveland | ............. | H02M 3/073 327/390 |
| 7,532,060 B2 | 5/2009 | Albano et al. | | |
| 2006/0077745 A1* | 4/2006 | Kitazaki | ................ | G11C 5/145 365/226 |
| 2017/0104408 A1* | 4/2017 | Rebollo Pimentel | ... | H02M 3/07 |

FOREIGN PATENT DOCUMENTS

| | | |
|---|---|---|
| CN | 106849642 A | 6/2017 |
| JP | 2009060702 A | 3/2009 |

OTHER PUBLICATIONS $1_{st}$ Office Action for CN Application No. 201910308632.7, dated Sep. 29, 2020.
"Office Action for CN 201910308632.7, dated Jul. 20, 2021".

* cited by examiner

*Primary Examiner* — Ryan Johnson
*Assistant Examiner* — Colleen J O Toole
(74) *Attorney, Agent, or Firm* — Dorsey & Whitney LLP (57) ABSTRACT

An apparatus and a method that provide a bias voltage to a charge pump circuit are described. An example apparatus includes: a bias voltage generator that receives a first voltage and provides a second voltage responsive to the first voltage; a charge pump circuit that receives an input signal and provides the first voltage. The charge pump circuit includes an inverter and a bias transistor. The inverter receives the input signal and provides a third voltage. The bias transistor coupled between a power node having a power supply voltage and a slew rate driver of the inverter. The bias transistor receives the second voltage and provides a power supply voltage to the slew rate driver responsive to the second voltage less than a threshold voltage and stops providing the power supply voltage to the slew rate driver responsive to the second voltage greater than the threshold voltage.

8 Claims, 7 Drawing Sheets

APPARATUSES AND METHODS FOR CONTROLLING CHARGE PUMP CIRCUITS

BACKGROUND

Figure 1A:
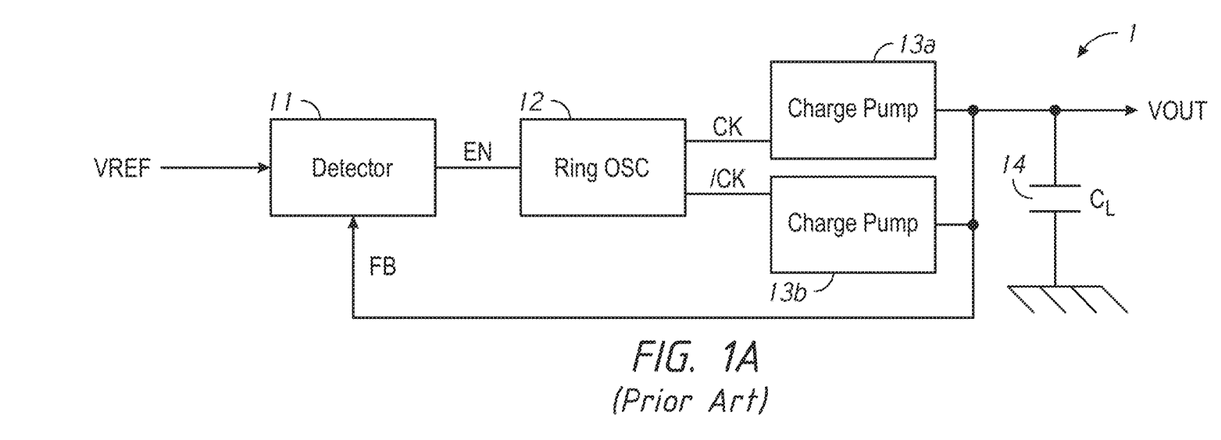
FIG. 1A is a schematic diagram of a conventional charge pump booster circuit in a semiconductor device.

Many traditional charge pump booster circuits maintain a desired output voltage by turning on and off a step-up power supply having a constant supply capability. FIG. 1A is a schematic diagram of a conventional charge pump booster circuit 1 in a semiconductor device. The conventional charge pump booster circuit 1 includes a detector 11 that receives an output voltage VOUT on a feedback node FB from a plurality of charge pump circuits 13a and 13b, and compares a test voltage generated from the output voltage VOUT with respect to a reference voltage VREF. For example, the detector 11 includes a voltage divider that provides the test voltage that is a partial voltage of the output voltage VOUT. The detector 11 enables or disables a ring oscillator 12 that provides a pair of clock signals CK and /CK to the plurality of charge pump circuits 13a and 13b, respectively to stabilize the output voltage VOUT. A capacitor $C_L$ 14 is a decoupling capacitor coupled between a ground level VSS and an output terminal of the conventional charge pump booster circuit 1. The capacitor $C_L$ 14 receives and accumulates charge from the plurality of charge pump circuits 13a and 13b and provide the output voltage VOUT during a charging interval, and decouples the output terminal from the ground level VSS.

Figure 1B:
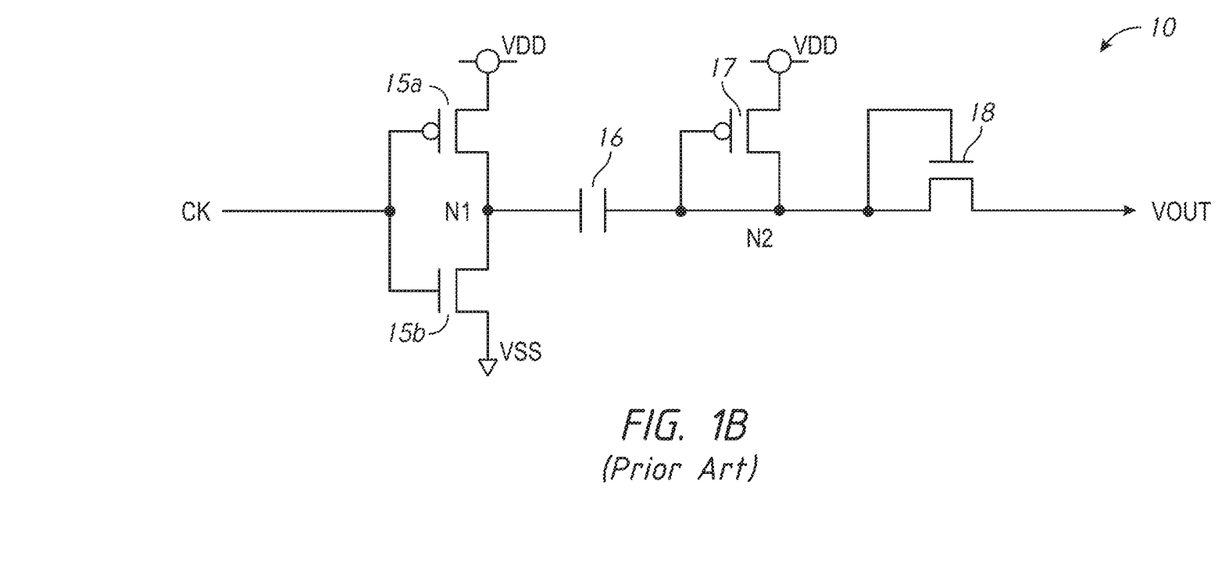
FIG. 1B is a schematic diagram of a charge pump circuit in the conventional charge pump booster circuit.

FIG. 1B is a schematic diagram of a charge pump circuit 10 in the conventional charge pump booster circuit 1. The charge pump circuit 10 includes a pair of slew rate drivers 15a and 15b coupled between a power supply voltage VDD and a ground or negative voltage VSS. The slew rate driver 15a is a p-channel field effect transistor for a transition from a logic low state to a logic high state. The slew rate driver 15b is an n-channel field effect transistor for a transition from a logic high state to a logic low state. The pair of slew rate drivers 15a and 15b receives the clock signal CK and provides an inverted clock signal having the power supply voltage VDD in an active state to a node N1 coupled to one end of a capacitor 16. The other end of the capacitor 16 is coupled to a node N2 that is also coupled to a gate and a drain of a p-channel field effect transistor 17 and a gate and a source of an n-channel field effect transistor 18. A source of the p-channel field effect transistor 17 is coupled to the power supply voltage VDD. A drain of the n-channel filed effect transistor 18 is coupled to an output terminal that provides an output voltage VOUT.

Figure 1C:
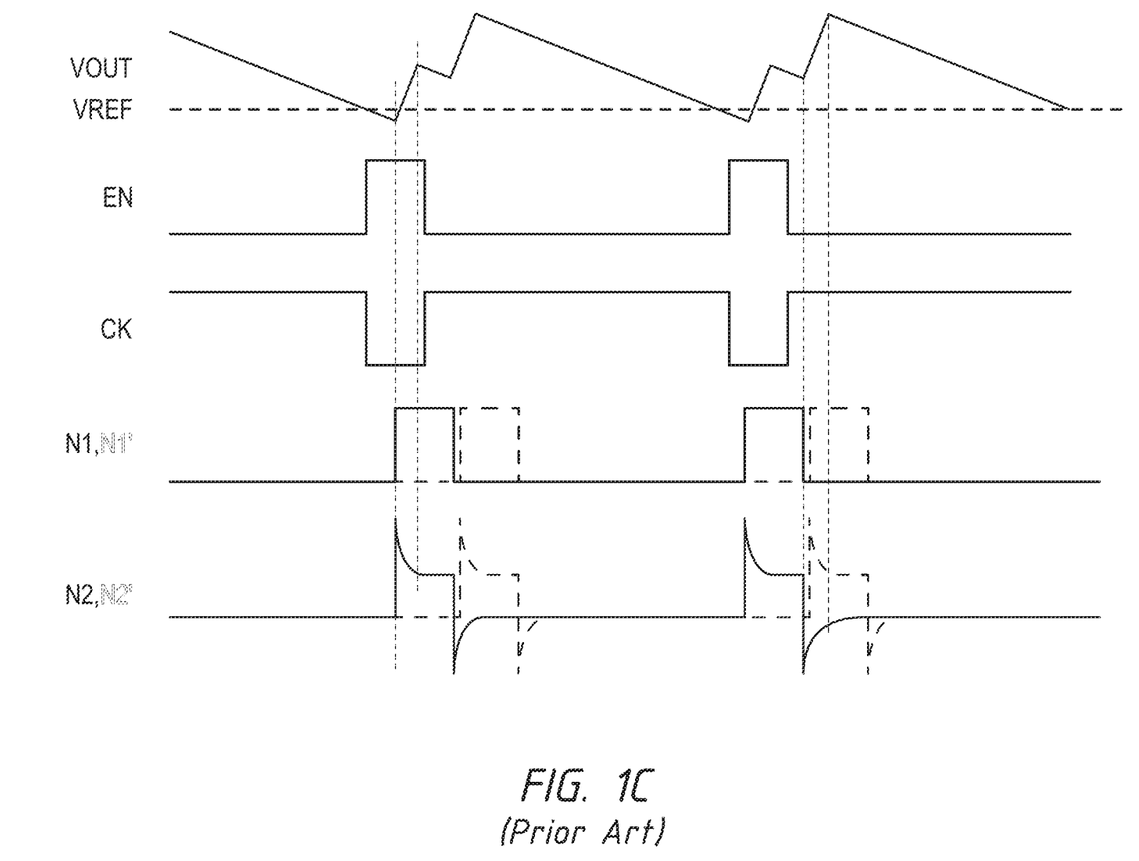
FIG. 1C is a timing diagram of signals in the charge pump circuit.

FIG. 1C is a timing diagram of signals in the charge pump circuit 10. The detector 11 provides the enable signal EN in an inactive state (e.g., a logic low "L" level) to disable the ring oscillator 12 when the output voltage VOUT is greater than the reference voltage VREF. When the output voltage VOUT becomes less than the reference voltage VREF shown in a dashed line, the detector 11 provides an enable signal EN in an active state (e.g., a logic high "H" level) that activates the ring oscillator 12. The ring oscillator 12 provides the complementary pair of clock signals CK and CK/ responsive to the enable signal EN with an internal delay. The pair of slew rate drivers 15a and 15b receives the clock signal CK and provides the inverted clock signal on the node N1, responsive to the clock signal CK. The node N2 is decoupled from the output terminal and coupled to the power supply voltage VDD to charge the node N2 to the power supply voltage VDD responsive to a logic high level of the clock signal CK with the delays. The node N2 is coupled to the output terminal to provide the output voltage VOUT based on a charge of the capacitor 16 while being decoupled from the power supply voltage VDD, responsive to a logic low level of the clock signal CK with delays at the pair of slew rate drivers 15a and 15b. Since the node N2 has been previously set to the power supply voltage VDD and the node N1 has rectangular pulses, a voltage VN2 of the node N2 abruptly increases up to about twice the power supply voltage VDD and then drops due to discharging. When the voltage VN2 is larger than the output voltage VOUT, a charge flows the node N2 through the n-channel filed effect transistor 18 to the output terminal that provides the output voltage VOUT. The output voltage VOUT tends to include undesired ripples on the node N2, due to fluctuation of a load current in the charge pump circuit 10 caused by the abrupt increase of the voltage VN2, especially when a capacitance of the is smaller than desired due to a limited chip size.

DETAILED DESCRIPTION OF PREFERRED EMBODIMENTS

Various embodiments of the present disclosure will be explained below in detail with reference to the accompanying drawings. The following detailed description refers to the accompanying drawings that show, by way of illustration, specific aspects and embodiments of the disclosure may be practiced. The specification provides sufficient detail to enable those skilled in the art to practice embodiments of the disclosure. Other embodiments may be utilized, and structure, logical and electrical changes may be made without departing from the scope of the disclosure. The various embodiments disclosed herein are not necessary mutually exclusive, as some disclosed embodiments can be combined with one or more other disclosed embodiments to form new embodiments.

Figure 2A:
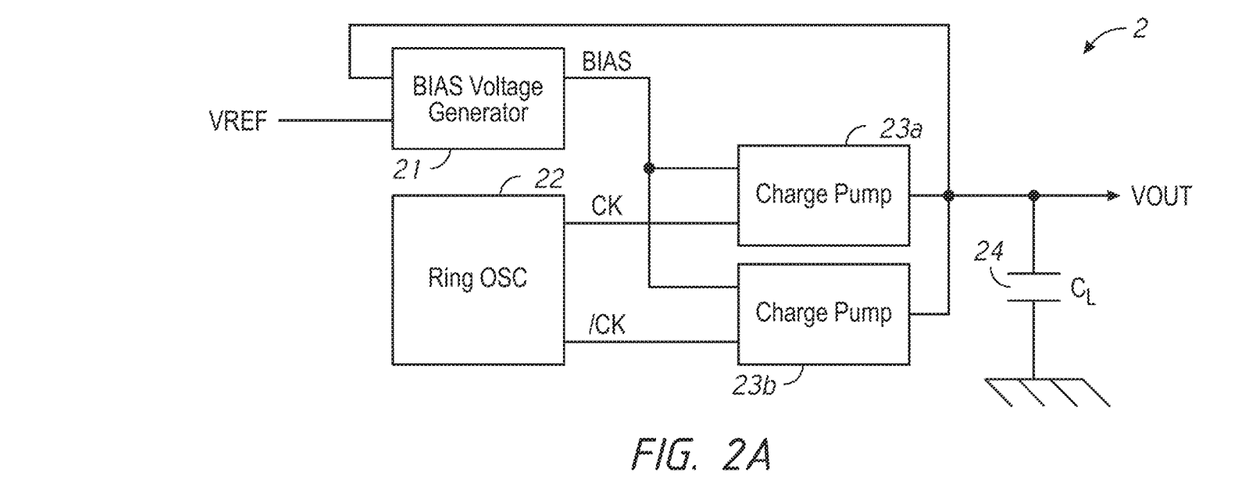
FIG. 2A is a schematic diagram of a charge pump booster circuit in accordance with an embodiment of the present disclosure.

FIG. 2A is a schematic diagram of a charge pump booster circuit 2 in accordance with an embodiment of the present disclosure. For example, the charge pump booster circuit 2 may include a bias voltage generator 21 that may compare an output voltage VOUT from a plurality of charge pump circuits (e.g., charge pump circuits 23a and 23b) with respect to a reference voltage VREF. The bias voltage generator 21 may provide a bias voltage BIAS to the plurality of charge pump circuits responsive to fluctuations of the output voltage VOUT. The output voltage VOUT may be responsive to a load current of the plurality of charge pump circuits, and the detected amplitude of voltage fluctuations of the output voltage VOUT becomes larger when the load current is larger. The bias voltage BIAS may be a continuous voltage. In some embodiments of the disclosure, the bias voltage generator 21 may be an operational amplifier that provides a bias voltage BIAS responsive to a detected amplitude of voltage fluctuations of the output voltage VOUT.

A ring oscillator 22 may provide a complementary pair of clock signals CK and /CK to the plurality of charge pump circuits 23a and 23b. The plurality of charge pump circuits 23a and 23b are coupled in parallel between the ring oscillator 22 and an output node that provide the output voltage VOUT. The plurality of charge pump circuits 23a and 23b may use the complementary pair of clock signals CK and /CK respectively as well as the bias voltage BIAS to stabilize the output voltage VOUT. A capacitor $C_L$ 24 is a decoupling capacitor coupled between a ground level and an output terminal of the charge pump booster circuit 2. The capacitor $C_L$ 24 may receive and accumulate charge from the plurality of charge pump circuits 23a and 23b and may further provide the output voltage VOUT during a charging interval, as well as decouple the output terminal from the ground level.

Figure 2B:
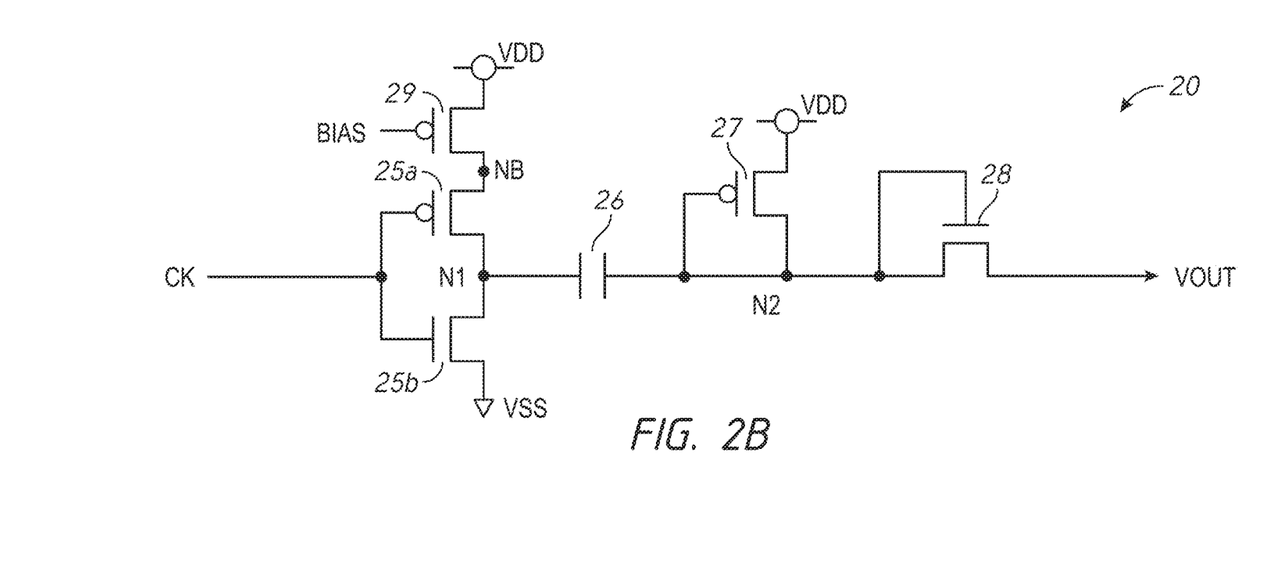
FIG. 2B is a schematic diagram of a charge pump circuit in the charge pump booster circuit in accordance with an embodiment of the present disclosure.
Figure 2C:
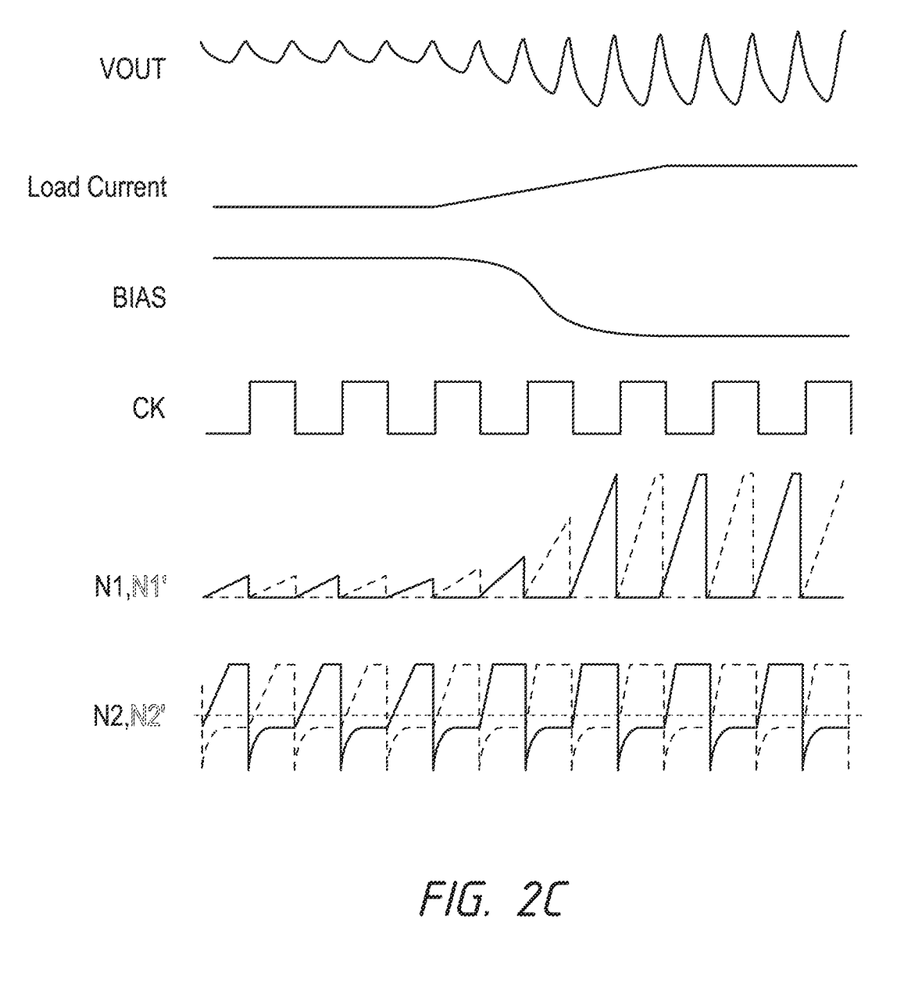
FIG. 2C is a timing diagram of signals in the charge pump circuit in accordance with an embodiment of the present disclosure.

FIG. 2B is a schematic diagram of a charge pump circuit 20 in the charge pump booster circuit 2 in accordance with an embodiment of the present disclosure. FIG. 2C is a timing diagram of signals in the charge pump circuit 20 in accordance with an embodiment of the present disclosure. A bias transistor 29 may be coupled between a power node having a first power supply voltage VDD and a source of a slew rate driver 25a. The bias transistor 29 may be a p-channel field effect transistor having a source that may receive the first power supply voltage VDD, a drain coupled to the slew rate driver 25a and a gate that may receive the bias voltage BIAS. A drain of the slew rate driver 25a may be coupled to a drain of a slew rate driver 25b at a node N1. A source of the slew rate driver 25b may receive a second power supply voltage VSS that is less than the first power supply voltage VDD. The slew rate drivers 25a and 25b may be field effect transistors having opposite channel polarities.

When a difference between the bias voltage BIAS and the first power supply voltage VDD at the source of the bias transistor 29 exceeds a threshold voltage VTH of the bias transistor 29 (e.g., caused by small fluctuations in the output voltage VOUT), the bias transistor 29 may provide a current source with regard to the first power supply voltage VDD. The bias transistor 29 may provide a current responsive to the bias voltage BIAS to the slew rate driver 25a. Thus, a first node voltage VN1 at the node N1 may have an amplitude between the second power supply voltage VSS and the first power supply voltage VDD or less. A rising slew rate is controlled by the current from bias transistor 29. Gates of the slew rate drivers 25a and 25b may receive the clock signal CK. Responsive to the clock signal CK, the slew rate drivers 25a and 25b provide an inverted clock signal to the node N1, which is coupled to one end of a capacitor 26.

The slew rate driver 25b may provide the second power supply voltage VSS to the node N responsive to the clock signal CK at a logic high level. Responsive to the first node voltage VN1 being the second power supply voltage VSS, the capacitor 26 starts discharging and a second node voltage VN2 at a node N2 coupled to the other end of the capacitor 26 may abruptly decrease. The second node voltage VN2 after the abrupt decrease may activate a transistor 27 to provide a biased first power supply voltage VDD−VTH2, where VTH2 is a threshold voltage of the transistor 27, to the node N2 while deactivating a transistor 28 to decouple an output terminal providing the output voltage VOUT from the node N2. Thus, the second node voltage VN2 is increased by the biased first power supply voltage VDD−VTH2 provided to the node N2. The transistor 27 may be a p-channel field effect transistor and the transistor 28 may be an n-channel field effect transistor.

The slew rate driver 25a may provide the first power supply voltage VDD or less to the node N1 responsive to the clock signal CK at a logic low level. The slew rate driver 25a may drive the one end of the capacitor 26 coupled to the node N1 to charge the capacitor 26. Responsive to the charging of the capacitor 26, the first node voltage VN1 may gradually increase to the power supply voltage VDD or less, responsive to the bias voltage BIAS. The second node voltage VN2 may further increase responsive to the gradual increase of the first node voltage VN1 across the capacitor 26. Once the second node voltage VN2 exceeds a threshold voltage of the transistor 28, the transistor 28 may couple the output terminal to the node N2 and the output terminal may provide the second node voltage VN2 as the output voltage VOUT, while the transistor 27 may be deactivated and stop providing the first power supply voltage VDD to the node N2.

When the difference between the reference voltage VREF and the output voltage VOUT is smaller, the bias voltage generator 21 may increase the bias voltage BIAS to reduce the difference between the bias voltage BIAS and the voltage at the drain of the bias transistor 29 accordingly, thus the bias transistor 29 may provide a weaker current source to the slew rate driver 25a. On the other hand, when the difference between the reference voltage VREF and the output voltage VOUT is larger (e.g., caused by large fluctuation in the output voltage VOUT), the bias voltage generator 21 may provide the bias voltage BIAS that is less. Then, the bias transistor 29 may provide a stronger current source. Thus, the first node voltage VN1 at the node N1 may have an amplitude between the second power supply voltage VSS and the first power supply voltage VDD or less with the controlled slew rate. The pair of slew rate drivers 25a and 25b may receive the clock signal CK. Responsive to the clock signal CK, the pair of slew rate drivers 25a and 25b may provide an inverted clock signal having an amplitude either the first power supply voltage VDD or the first power supply voltage VDD, irrespective of the bias voltage BIAS to the node N1.

The slew rate driver 25b may provide the second power supply voltage VSS to the node N1 responsive to the clock signal CK at a logic high level regardless of the bias voltage BIAS. The second node voltage VN2 at the node N2 may abruptly decrease and then may increase to the neutral voltage and stay stable.

The slew rate driver 25a may provide the first power supply voltage VDD to the node N1 responsive to the clock signal CK at the logic low level, while the bias voltage BIAS is in the active state. The first power supply voltage VDD may be further provided to the one end of the capacitor 26 coupled to the node N1 to charge the capacitor 26. Responsive to the charging of the capacitor 26, the first node voltage VN1 may gradually increase to the first power supply voltage VDD. The second node voltage VN2 may further increase responsive to the gradual increase of the first node voltage VN1 across the capacitor 26. Once the second node voltage VN2 exceeds a threshold voltage of the transistor 28, the transistor 28 may couple the output terminal to the node N2 and the output terminal may provide the second node voltage VN2 as the output voltage VOUT. The increasing second node voltage VN2 also deactivates the transistor 27 that provides the power supply voltage VDD to the node N2. As the capacitor 26 continues charging, the second node voltage VN2 continues to increase to a voltage greater than the first power supply voltage VDD. Thus, the charge pump circuit 20 may provide the output voltage VOUT greater than the first power supply voltage VDD.

The plurality of charge pump circuits 23a and 23b in FIG. 2A may be the charge pump circuit 20 receiving the complementary pair of clock signals CK and /CK respectively. The charge pump circuit 23b may include nodes N1' and N2' instead of the nodes N1 and N2. The timing diagrams of first and second voltages VN1' and VN2' at the nodes N1' and N2' are also shown in FIG. 2C. As shown, the second node voltages VN2 and VN2' alternatively have two levels of relatively stable voltages responsive to the complementary pair of clock signals CK and /CK. Thus, the output voltage VOUT may be stabilized across clock cycles.

Figure 3:
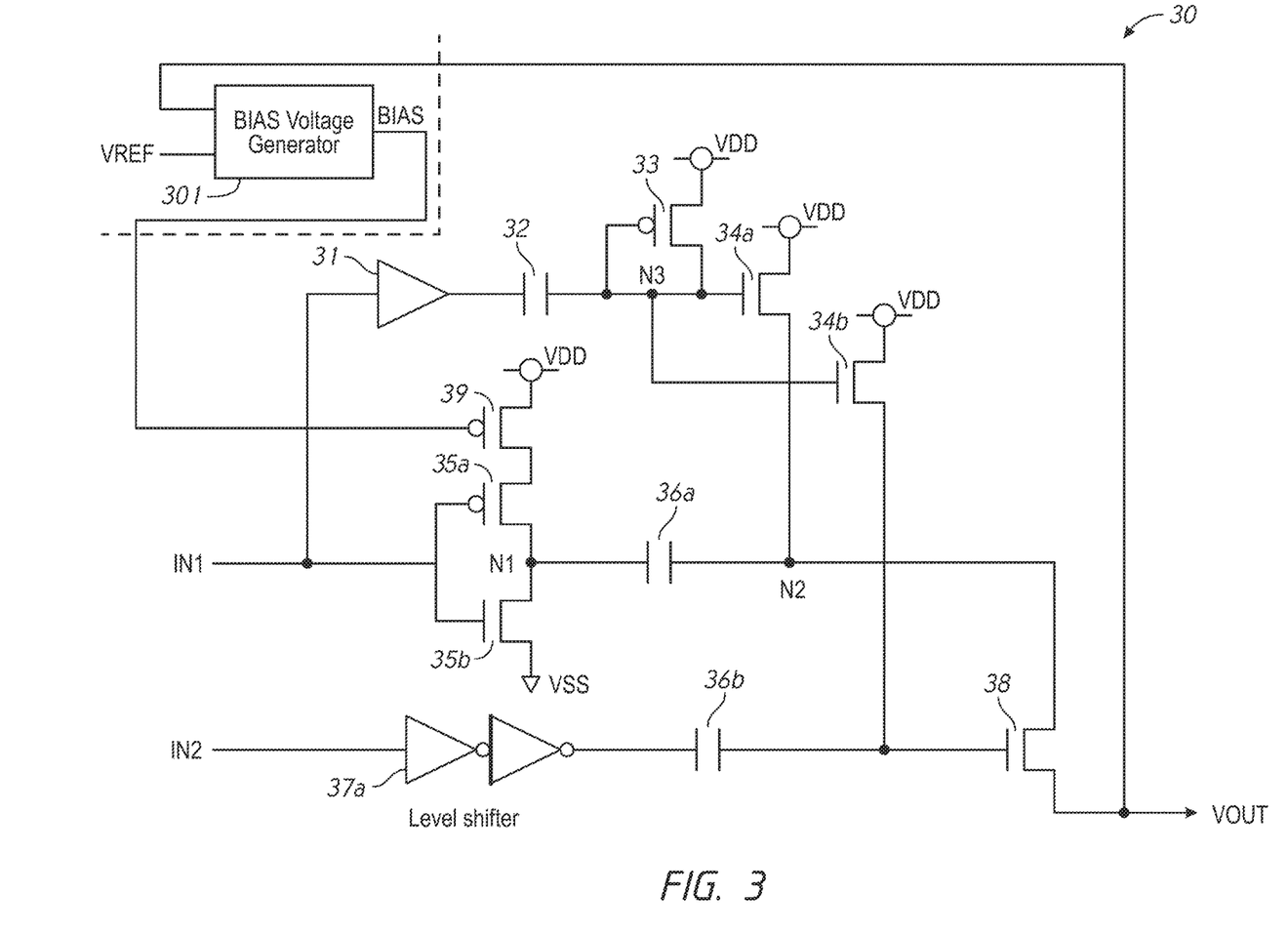
FIG. 3 is a schematic diagram of a charge pump circuit in accordance with an embodiment of the present disclosure.

FIG. 3 is a schematic diagram of a charge pump circuit 30 in accordance with an embodiment of the present disclosure. The charge pump circuit 30 may include a driver 31 that may receive an input signal IN1. The driver 31 may provide a logic high level signal to one end of a capacitor 32 responsive to the input signal IN1 at a logic high level, and the capacitor 32 may start boosting. In response, a voltage VN3 at a node N3 of the other end of the capacitor 32 may abruptly increase and activate transistors 34a and 34b to start providing the first power supply voltage VDD to each of nodes N2 and N4. Thus, voltages VN2 and VN4 at the nodes N2 and N4 respectively may increase to the first power supply voltage VDD and stay stable. The driver 31 may provide a logic low level signal to the one end of the capacitor 32 responsive to the input signal IN1 at the logic low level, and the capacitor 32 may start discharging. Responsive to the discharging of the capacitor 32, the voltage VN3 at the node N3 may decrease. The decrease in voltage at the node N3 may activate a transistor 33. Once the voltage difference (VN3–VN2) between the nodes N3 and N2 exceeds a threshold voltage of the transistors 34a and 34b, the transistors 34a and 34b may be activated to provide the first power supply voltage VDD to the nodes N2 and N4, while the transistor 33 may be deactivated. Thus, the transistor 33 may stop providing the first power supply voltage VDD to the other end of the capacitor 32. The increase in the voltage of node N3 may activate the transistors 34a and 34b to provide the first power supply voltage VDD to the nodes N2 and N4.

The charge pump circuit 30 may include a bias transistor 39 coupled between a power node having the first power supply voltage VDD and a source of a slew rate driver 35a. A drain of the slew rate driver 35a may be coupled to a drain of a slew rate driver 35b at a node N1. A source of the slew rate driver 35b may receive a second power supply voltage VSS that is less than the first power supply voltage VDD. The bias transistor 39 may be a p-channel field effect transistor having a source that may receive the first power supply voltage VDD, a drain coupled to the slew rate driver 35a and a gate that may receive the bias voltage BIAS from a bias voltage generator 301. The bias voltage generator 301 may provide the bias voltage BIAS, responsive to an output voltage VOUT of the charge pump circuit 30 with reference to a reference voltage VREF. The slew rate drivers 35a and 35b may be field effect transistors having opposite channel polarities.

Gates of the slew rate drivers 35a and 35b may receive the input signal IN1. Responsive to the input signal IN1, the slew rate drivers 35a and 35b may further provide an inverted input signal, that may be either biased by the bias transistor 39 to the node N1, which is coupled to one end of a capacitor 36a responsive to the bias voltage BIAS. For example, while the bias voltage BIAS is smaller due to small fluctuations in the output voltage VOUT, the bias transistor 39 may couple the slew rate driver 35a from the power node providing the first power supply voltage VDD with the controlled slew rate. Thus, a first node voltage VN1 at the node N may have an amplitude between the second power supply voltage VSS and a first power supply voltage VDD or less For example, the slew rate driver 35b may provide the second power supply voltage VSS to the node N1 responsive to the input signal IN1 at the logic high level. Responsive to the first node voltage VN1 being the second power supply voltage VSS, the capacitor 36a starts charging. Thus, responsive to the input signal IN1 at the logic high level, together with starting to provide the first power supply voltage VDD by the transistor 34a and charging of the capacitor 36a, a second node voltage VN2 at the node N2 coupled to the other end of the capacitor 36a may abruptly increase.

For example, the slew rate driver 35a may provide either the first power supply voltage VDD or less to the node N1 responsive to the bias voltage BIAS. The first power supply voltage VDD or less may be further provided to the one end of the capacitor 36a coupled to the node N1. The capacitor 36a starts charging and the first node voltage VN1 may gradually increase to either the first power supply voltage VDD or less. Thus, responsive to the input signal IN1 at the logic high level, the first power supply voltage VDD may be provided to the node N2 by the transistor 34a and the second node voltage VN2 at the node N2 may increase to the first power supply voltage VDD. Furthermore, the second node voltage VN2 at the node N2 may gradually increase from the first power supply voltage VDD to a voltage greater than the first power supply voltage VDD, responsive to charging of the capacitor 36a. Thus, depending on the state of the bias voltage BIAS, the second node voltage VN2 may increase to the different levels.

For example, the charge pump circuit 30 may include a level shifter 37a. The level shifter 37a may receive an input signal IN2 and provide a level shifted input signal to one end of a capacitor 36b to charge the capacitor 36b. Thus, responsive to charging of the capacitor 36b or the transistor 34b being activated to provide the first power supply voltage VDD, a transistor 38 may be activated to provide the second node voltage VN2 as an output voltage VOUT. Thus the output voltage VOUT may be at the different levels responsive to the state of the bias voltage BIAS.

Figure 4:
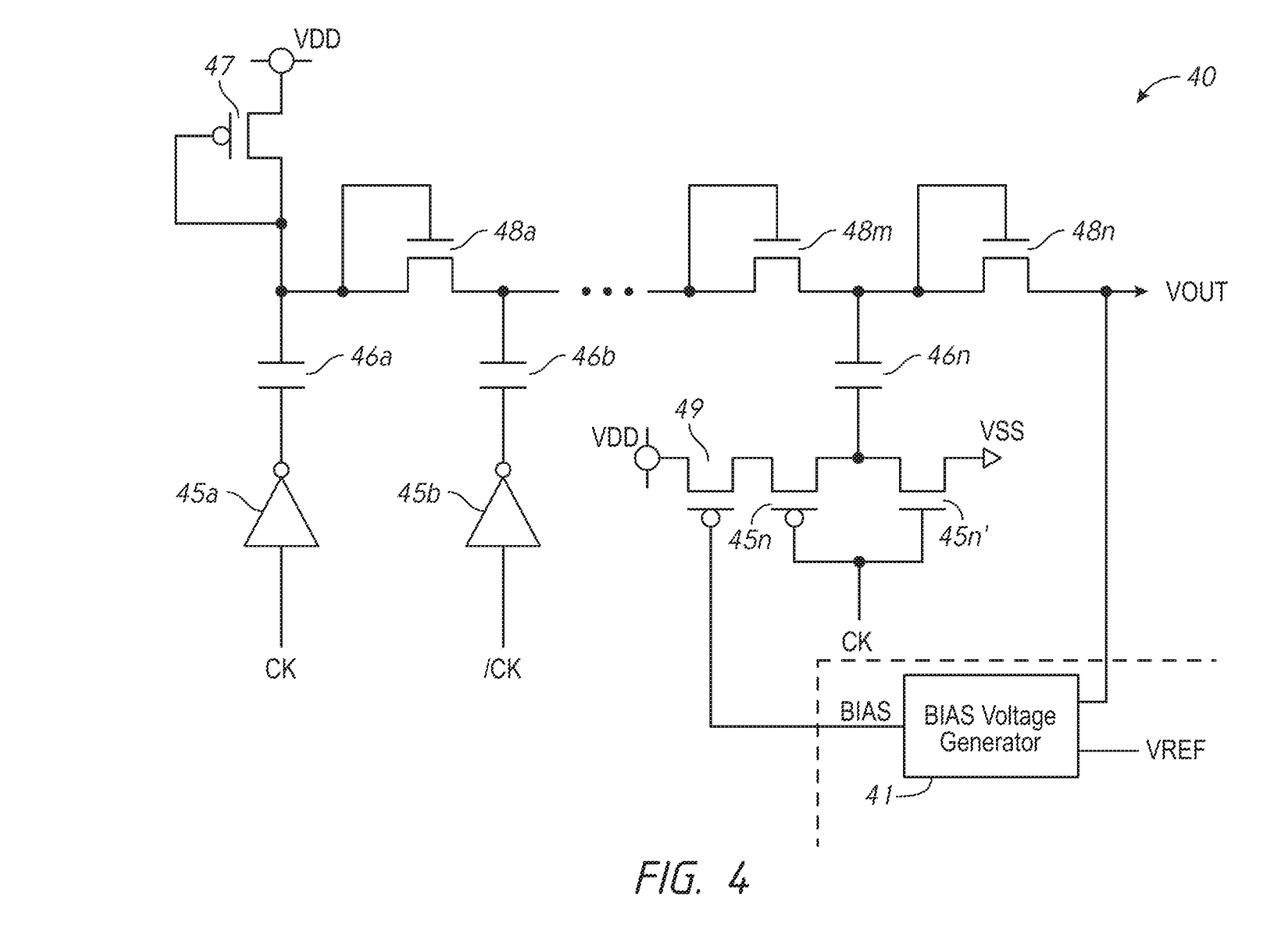
FIG. 4 is a schematic diagram of a charge pump circuit in accordance with an embodiment of the present disclosure.

FIG. 4 is a schematic diagram of a charge pump circuit 40 in accordance with an embodiment of the present disclosure. The charge pump circuit 40 may include an inverter 45a that may provide an inverted clock signal to one end of a capacitor 46a responsive to a clock signal CK. For example, when the clock signal CK is at a logic high level, the inverted clock signal becomes at a logic low level which discharges the capacitor 46a. Thus, a voltage at the other end of the capacitor 46a may abruptly decrease. However, the other end of the capacitor 46a is coupled to a gate and a drain of a transistor 47, and the decreased voltage at the other end of the capacitor 46a may activate the transistor 47 to provide a first power supply voltage VDD to the drain of the transistor 47. The drain of the transistor 47 is also coupled to a gate and source of a transistor 48a. Thus, responsive to the first power supply voltage VDD provided to the gate of the transistor 48a, the voltage at the other end of the capacitor 46a, which is the voltage of the source of the transistor 48a, may be provided to a drain of the transistor 48a.

The charge pump circuit 40 may include an inverter 45b that may provide an inverted clock signal to one end of a capacitor 46b responsive to a complementary clock signal /CK. For example, when the clock signal CK is at a logic high level, and the inverter 45b may provide a logic high level signal responsive to the complementary clock signal /CK at a logic low level. Thus, the capacitor 46b starts charging responsive to the logic high level signal from the inverter 45b. Thus, a voltage at the other end of the capacitor 46b may gradually increase. At the same time, the first power supply voltage VDD may be provided via the transistors 47 and 48a. Thus, the voltage at the other end of the capacitor 46b, which is the voltage at the drain of the transistor 48a, may increase from the first power supply voltage VDD to a voltage greater than the first power supply voltage. Similarly, a voltage is increased by capacitors coupled in parallel via transistors to charge the voltage towards an output terminal which may provide an output voltage VOUT.

The charge pump circuit 40 may include a bias transistor 49 and slew rate drivers 45n and 45n'. For example, the bias transistor 49 may be a p-channel field effect transistor having a source that may receive the first power supply voltage VDD, a drain coupled to the slew rate driver 45a and a gate that may receive a bias voltage BIAS from a bias voltage generator 41. For example, the slew rate drivers 45a and 45b may be field effect transistors having opposite channel polarities and drains of the slew rate drivers 45a and 45b are coupled to each other.

When a difference between the first power supply voltage VDD at the source of the bias transistor 49 and the bias voltage BIAS exceeds a threshold voltage VTH of the bias transistor 49 (e.g., caused by small fluctuations in the output voltage VOUT), the bias transistor 49 may provide a voltage based on the difference between the bias voltage BIAS and the first power supply voltage VDD. The bias transistor 49 may provide the first power supply voltage VDD or less to the slew rate driver 45a. Thus, a voltage at a node coupled to the drains of the slew rate drivers 45a and 45b may have an amplitude between the second power supply voltage VSS and the first power supply voltage VDD or less. Gates of the slew rate drivers 45a and 45b may receive the clock signal CK. Responsive to the clock signal CK, the slew rate drivers 45a and 45b may further provide an inverted clock signal that may be biased by the bias transistor 49 to the node coupled to the drains of the slew rate drivers 45a and 45b, which is coupled to one end of a capacitor 46n.

The slew rate driver 45n may provide the first power supply voltage VDD- or less to the node coupled to the one end of a capacitor 46n, responsive to the clock signal CK at the logic low level. Responsive to the charging of the capacitor 46n, a voltage at the node coupled to the one end of the capacitor 46n may gradually increase to the first power supply voltage VDD or less. Responsive to the gradual increase of the voltage at the one end of the capacitor 46n, a voltage at a drain of a transistor 48m that is coupled to the other end of the capacitor 46n may further increase to different levels, depending on the bias voltage BIAS. Once the voltage at the drain of a transistor 48m that is coupled to the other end of the capacitor 46n becomes exceeds a threshold voltage of a transistor 48n, the transistor 48n may provide the voltage at the drain of a transistor 48m to the output terminal as the output voltage VOUT. Thus, depending on fluctuations of the output voltage VOUT, the bias transistor 49 and the slew rate drivers 45n and 45n' may control the output voltage VOUT by charging the capacitor 46n to the different levels.

Figure 5:
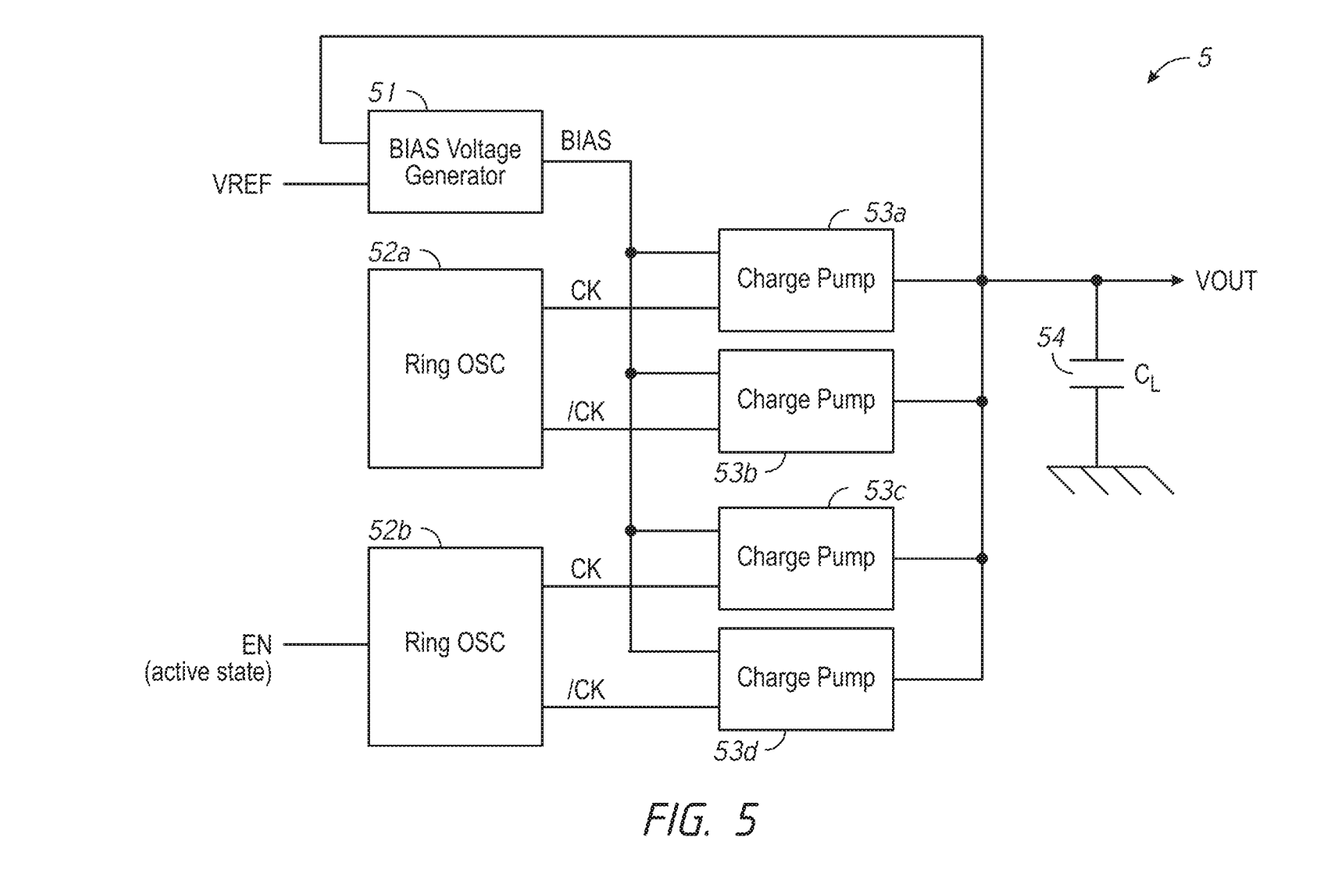
FIG. 5 is a schematic diagram of a charge pump booster circuit in a semiconductor device in accordance with an embodiment of the present disclosure.

FIG. 5 is a schematic diagram of a charge pump booster circuit 5 in accordance with an embodiment of the present disclosure. For example, the charge pump booster circuit 5 may include a bias voltage generator 51 that may compare an output voltage VOUT from a plurality of charge pump circuits (e.g., charge pump circuits 53a, 53b, 53c and 53d) with respect to a reference voltage VREF. The bias voltage generator 51 may provide a bias voltage BIAS to the plurality of charge pump circuits responsive to fluctuations of the output voltage VOUT. For example, the bias voltage generator 51 may be an operational amplifier that provides a bias voltage BIAS responsive to a detected amplitude of voltage fluctuations of the output voltage VOUT. For example, the output voltage VOUT may be responsive to a load current of the plurality of charge pump circuits, and the detected amplitude of voltage fluctuations of the output voltage VOUT becomes larger when the load current is larger. A plurality of ring oscillators 52a and 52b may provide a complementary pair of clock signals CK and /CK. For example the ring oscillator 52b may be activated responsive to an enable signal EN. For example, the charge pump circuits 53a and 53b may receive the clock signal CK and its complementary clock signal CK from the ring oscillator 52a, respectively. The charge pump circuits 53c and 53d may receive the clock signal CK and its complementary clock signal /CK from the ring oscillator 52b, respectively. Each charge pump circuit of the plurality of charge pump circuits 53a, 53b, 53c and 53d may use one of the complementary pair of clock signals CK and /CK as well as the bias voltage BIAS to stabilize the output voltage VOUT. A capacitor $C_L$ 54 is a decoupling capacitor coupled between a ground level and an output terminal of the charge pump booster circuit 5. The capacitor $C_L$ 54 receives and accumulates charge from the plurality of charge pump circuits 53a, 53b, 53c and 53d and provides the output voltage VOUT during a charging interval, and decouples the output terminal from the ground level. Thus, fluctuations of the output voltage VOUT may be able to be controlled the charge pump booster circuit 5 either by activating the ring oscillator 52b responsive to the enable signal EN, by the bias voltage BIAS from the bias voltage generator 51, or both.

Logic levels of signals used in the embodiments described the above are merely examples. However, in other embodiments, combinations of the logic levels of signals other than those specifically described in the present disclosure may be used without departing from the scope of the present disclosure.

Although embodiments of the disclosure have been described, it will be understood by those skilled in the art that the disclosure extends beyond the specifically disclosed embodiments to other alternative embodiments and/or uses and obvious modifications and equivalents thereof. In addition, other modifications which are within the scope of the disclosure will be readily apparent to those of skill in the art. It is also contemplated that various combination or sub-combination of the specific features and aspects of the embodiments may be made and still fall within the scope of the disclosure. It should be understood that various features and aspects of the disclosed embodiments can be combined with or substituted for one another in order to form varying modes of other embodiments of the disclosure. Thus, it is intended that the scope of the disclosure should not be limited by the particular disclosed embodiments described above.

What is claimed is:

1. An apparatus comprising:
   a bias voltage generator configured to receive a first voltage and further configured to provide a second voltage responsive to the first voltage;
   a first ring oscillator configured to provide a first clock signal and a first complementary clock signal;
   a second ring oscillator configured to provide a second clock signal and a second complementary clock signal, the second ring oscillator configured to activate in response to an enable signal;
   a first set of charge pump circuits coupled to the first ring oscillator and comprising a first charge pump circuit and a second charge pump circuit different from the first charge pump circuit, wherein the first charge pump circuit receives of the first clock signal, and the second charge pump circuit receives the first complementary signal; and
   a second set of charge pump circuits coupled to the second ring oscillator and comprising a third charge pump circuit and a fourth charge pump circuit, wherein the third charge pump circuit receives the second clock signal, and the fourth charge pump circuit receives the second complementary signal, the second set of charge pump circuits and the first set of charge pump circuits being coupled in parallel to an output node that is configured to provide the first voltage,
   wherein each charge pump circuit is configured to receive the second voltage from the bias voltage generator,
   wherein each charge pump circuit is configured to receive an input signal and further configured to provide the first voltage, each charge pump circuit including:
      an inverter including a first slew rate driver and a second slew rate driver coupled to the first slew rate driver at a first node, the inverter configured to receive the input signal and further configured to provide a third voltage; and
      a bias transistor coupled between a power node having a first power supply voltage and the first slew rate driver,
   wherein the bias transistor is configured to receive the second voltage and further configured to provide a current to the first slew rate driver responsive to the second voltage,
   wherein the second slew rate driver is configured to receive a second power supply voltage that is less than the first power supply voltage,
   wherein the first slew rate driver is configured to provide the third voltage to the first node responsive to the input signal at the first logic level, wherein the third voltage is the first power supply voltage when the second voltage is less than a threshold voltage and wherein the third voltage is a third power supply voltage between the first power supply voltage and the second power supply voltage when the second voltage is greater than the threshold voltage, and
   wherein the second slew rate driver is configured to provide the second power supply voltage as the third voltage to the first node responsive to the input signal at the second logic level different from the first logic level.

2. The apparatus of claim 1, wherein the second voltage is continuous.

3. The apparatus of claim 2, wherein the bias voltage generator is configured to receive a reference voltage, and further configured to detect an amplitude of voltage fluctuations in the first voltage with reference to the reference voltage and provide the second voltage.

4. The apparatus of claim 2, wherein the bias voltage generator is configured to increase the second voltage responsive to a decrease of the amplitude of voltage fluctuations and further configured to decrease the second voltage responsive to an increase of the amplitude of voltage fluctuations, and
   wherein the current is larger responsive to a decrease of the second voltage and the current is smaller responsive to an increase of the second voltage.

5. The apparatus of claim 1, wherein each charge pump circuit further comprises:
   a capacitor having a first end coupled to the first node and a second end coupled to a second node;
   a first switch coupled between the second node and the power node, and configured to provide the first power supply voltage to the second node responsive to a fifth voltage at the second node; and
   a second switch configured to provide the fifth voltage as the first voltage responsive to the fifth voltage,
   wherein the capacitor is configured to increase the fifth voltage greater than the first power supply voltage responsive to the third voltage.

6. The apparatus of claim 1, wherein the first charge pump circuit and the second charge pump circuit are coupled in parallel to the output node that is configured to provide the first voltage.

7. The apparatus of claim 1, wherein the first charge pump circuit and the second charge pump circuit are coupled in serial, and
   wherein the first charge pump circuit is coupled to an output node that is configured to provide the first voltage.

8. The apparatus of claim 1, wherein each charge pump circuit is a switched capacitor.

* * * * *

UNITED STATES PATENT AND TRADEMARK OFFICE
CERTIFICATE OF CORRECTION

PATENT NO. : 11,509,214 B2
APPLICATION NO. : 15/963909
DATED : November 22, 2022
INVENTOR(S) : Takamasa Suzuki It is certified that error appears in the above-identified patent and that said Letters Patent is hereby corrected as shown below:

In the Claims

| Column | Line | Claim | | Should Be |
|--------|------|-------|--|-----------|
| 9 | 22 | 1 | receives of the first clock signal | receives the first clock signal |

Signed and Sealed this
Seventh Day of February, 2023

Katherine Kelly Vidal
*Director of the United States Patent and Trademark Office*